US012116053B2

(12) United States Patent
Lee et al.

(10) Patent No.: US 12,116,053 B2
(45) Date of Patent: Oct. 15, 2024

(54) STEERING ASSIST DEVICE

(71) Applicant: HL MANDO CORPORATION, Pyeongtaek (KR)

(72) Inventors: Su-Min Lee, Siheung (KR); Kyu Yeong Je, Yongin (KR)

(73) Assignee: HL MANDO CORPORATION, Pyeongtaek (KR)

( * ) Notice: Subject to any disclaimer, the term of this patent is extended or adjusted under 35 U.S.C. 154(b) by 267 days.

(21) Appl. No.: 17/719,371

(22) Filed: Apr. 13, 2022

(65) Prior Publication Data
US 2022/0363308 A1 Nov. 17, 2022

(30) Foreign Application Priority Data
May 13, 2021 (KR) .................. 10-2021-0062174

(51) Int. Cl.
*B62D 5/04* (2006.01)
(52) U.S. Cl.
CPC ........... *B62D 5/049* (2013.01); *B62D 5/0463* (2013.01); *B62D 5/0484* (2013.01)
(58) Field of Classification Search
CPC .... B62D 5/049; B62D 5/0463; B62D 5/0484; B62D 5/04; B62D 5/046

USPC .......................................................... 701/41
See application file for complete search history.

(56) References Cited

FOREIGN PATENT DOCUMENTS

| KR | 20180013112 A | 2/2018 | | |
|----|---------------|--------|----|--------|
| KR | 20190050614 A | 5/2019 | | |
| WO | WO-2018025759 A1 | * | 2/2018 | ............... B62D 5/04 |
| WO | WO-2021114566 A1 | * | 6/2021 | ............... B62D 5/04 |

\* cited by examiner

*Primary Examiner* — Lindsay M Low
*Assistant Examiner* — Omar Morales
(74) *Attorney, Agent, or Firm* — Harvest IP Law, LLP

(57) ABSTRACT

The present embodiments relate to a steering assist device. A steering assist device may comprise a first current sensor obtaining a first current value, a second current sensor obtaining a second current value, a third current sensor obtaining a third current value, a fourth current sensor obtaining a fourth current value, and a controller unit comparing the first current value with the third current value determining a state of at least one of the first current sensor or the third current sensor according to a result of the comparison, comparing the second current value with the fourth current value, determining a state of at least one of the second current sensor or the fourth current sensor according to a result of the comparison, and controlling a steering motor according to a result of the determination.

20 Claims, 15 Drawing Sheets

FIG.3
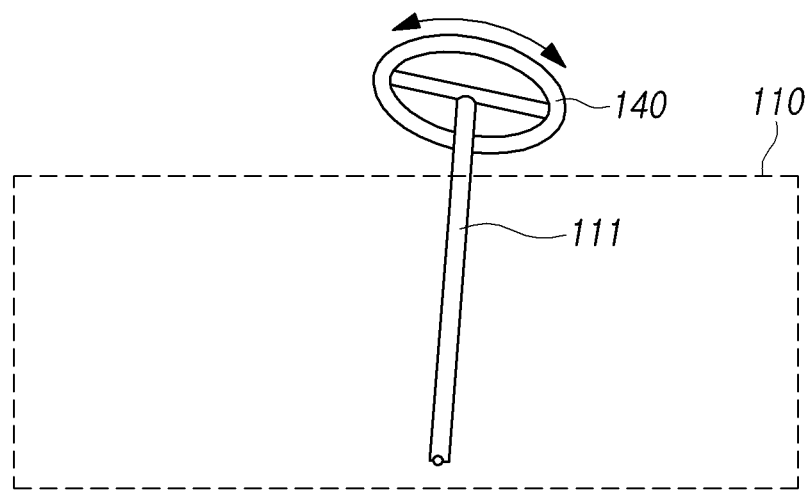
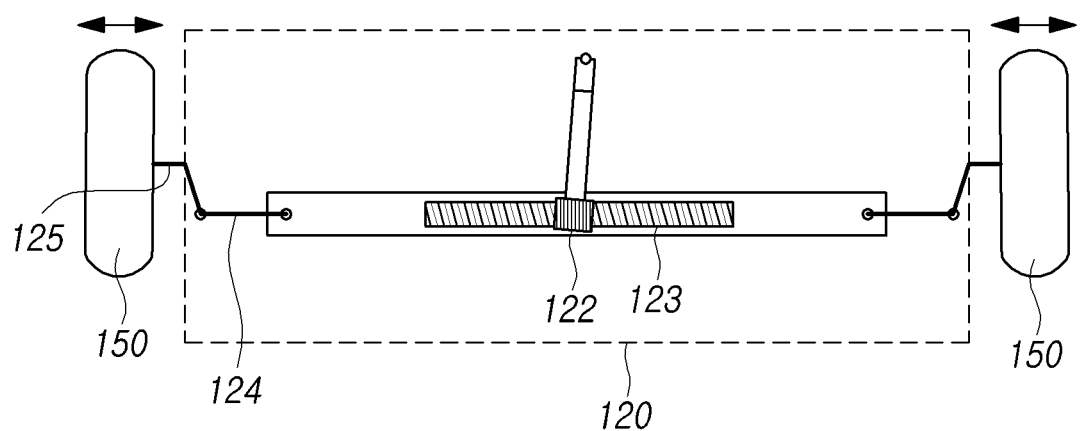

STEERING ASSIST DEVICE

CROSS-REFERENCE TO RELATED APPLICATION

This application claims priority from Korean Patent Application No. 10-2021-0062174, filed on May 13, 2021, which is hereby incorporated by reference for all purposes as if fully set forth herein.

BACKGROUND

Field

The present embodiments relate to a steering assist device.

Description of Related Art

In general, steering system refers to a system in which the driver of a vehicle may change the steering angle of the wheels of a vehicle based on the steering force (or rotational force) applied to the steering wheel. Electromotive power steering systems, e.g., electric power steer (EPS), have been recently applied to vehicles to ensure stable steering by reducing the steering force of the steering wheel.

The requirement for reliability and redundancy is recently increasing for vehicle steering systems. Also increasing is the demand for research and development for redundancy of the current sensor in the steering system of the autonomous vehicle.

BRIEF SUMMARY

The present embodiments may provide a steering assist device capable of securing reliability through the redundancy of the current sensor.

In an aspect, the present embodiments may provide a steering assist device comprising a first current sensor obtaining a first current value, a second current sensor obtaining a second current value, a third current sensor obtaining a third current value, a fourth current sensor obtaining a fourth current value, and a controller unit comparing the first current value with the third current value determining a state of at least one of the first current sensor or the third current sensor according to a result of the comparison, comparing the second current value with the fourth current value, determining a state of at least one of the second current sensor or the fourth current sensor according to a result of the comparison, and controlling a steering motor according to a result of the determination, wherein the first current sensor and the second current sensor, respectively, are positioned on two of three power paths respectively connecting three legs of an inverter with three phases of the steering motor, wherein the third current sensor is positioned on a leg of the inverter connected with a power path where the first current sensor is positioned, and the fourth current sensor is positioned on a leg of the inverter connected with a power path where the second current sensor is positioned.

In another aspect, the present embodiments may provide a steering assist device comprising a first current sensor obtaining a first current value, a second current sensor obtaining a second current value, a third current sensor obtaining a third current value, and a controller unit comparing a total current value of the first current value to the third current value with a preset normal total current value, determining a state of the first current sensor to the third current sensor according to a result of the comparison, and controlling a steering motor according to a result of the determination, wherein the first current sensor and the second current sensor, respectively, are positioned on two of three power paths respectively connecting three legs of an inverter with three phases of the steering motor, wherein the third current sensor is positioned on a leg of the inverter connected with a power path other than two power paths where the first current sensor and the second current sensor, respectively, are positioned.

According to the present embodiments, it is possible to provide a steering assist device capable of securing reliability through the redundancy of the current sensor.

DESCRIPTION OF THE DRAWINGS

The above and other objects, features, and advantages of the present disclosure will be more clearly understood from the following detailed description, taken in conjunction with the accompanying drawings, in which:

FIGS. 2 and 3 are views illustrating a steering device according to the present embodiments;

DETAILED DESCRIPTION

Figure 1:
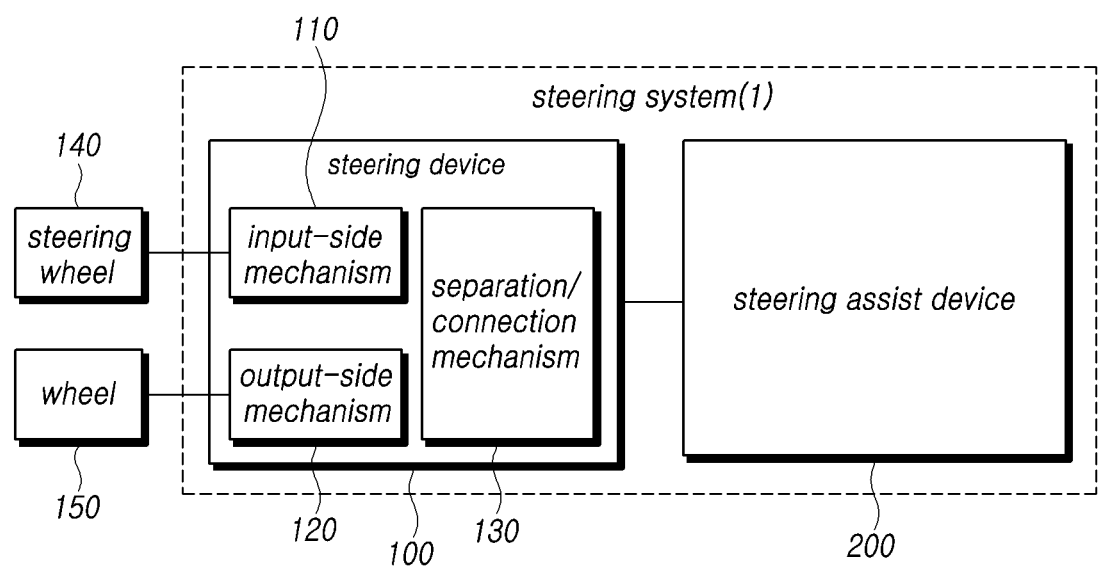
FIG. 1 is a block diagram illustrating a configuration of a steering system according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating a configuration of a steering system according to the present embodiments.

Referring to FIG. 1, according to the present embodiments, a steering system 1 may include at least one of a steering device 100 or a steering assist device 200.

The steering device 100 and the steering assist device 200 may be connected by at least one of an electrical, magnetic, or mechanical connection.

The steering device 100 may change the steering angle of a wheel 150 based on a steering force (or rotational force) applied to the steering wheel 140.

The steering device 100 may include at least one of an input-side mechanism 110, an output-side mechanism 120, or a separation/connection mechanism 130.

The input-side mechanism 110, the output-side mechanism 120, and the separation/connection mechanism 130 may be connected by at least one of an electrical, magnetic, or mechanical connection.

The input-side mechanism 110 may be connected to the steering wheel 140. The input-side mechanism 110 may rotate in a rotational direction of the steering wheel 140 or in a direction opposite to the rotational direction of the steering wheel 140.

The output-side mechanism 120 may be connected with the input-side mechanism 110. For example, the output-side mechanism 120 may be connected to the input-side mechanism 110 by at least one of an electrical or mechanical connection.

The output-side mechanism 120 may be connected with the wheel 150. The output-side mechanism 120 may change the steering angle (or movement) of the wheel 150.

The separation/connection mechanism 130 may be connected to the input-side mechanism 110 and the output-side mechanism 120. The separation/connection mechanism 130 may mechanically and/or electrically connect and/or separate the input-side mechanism 110 and the output-side mechanism 120.

The separation/connection mechanism 130 may include a clutch but, without limitations thereto, may include any mechanism (or device) that may connect and/or separate the input-side mechanism and the output-side mechanism.

The steering assist device 200 may be connected with the steering device 100. The steering assist device 200 may assist the steering device 100.

The steering wheel 140 may be connected with the input-side mechanism 110. The steering wheel 140 may rotate the input-side mechanism 110.

The wheel 150 may be connected with the output-side mechanism 120. The wheel 150 may change the steering angle (or movement) by the output-side mechanism 120.

The steering wheel 140 and the wheel 150 may not be included in the steering device 100 as illustrated in the drawings but, without limitations thereto, may be included in the steering device 100.

According to the present embodiments, the steering device may include at least one of a steering device in which an input-side mechanism and an output-side mechanism are connected mechanically, a steering device (e.g., steer by wire (SbW)) in which an input-side mechanism and an output-side mechanism are connected electrically, or a steering device (e.g., an SbW including a clutch) in which an input-side mechanism and an output-side mechanism are connected with a separation/connection mechanism.

Figure 2:
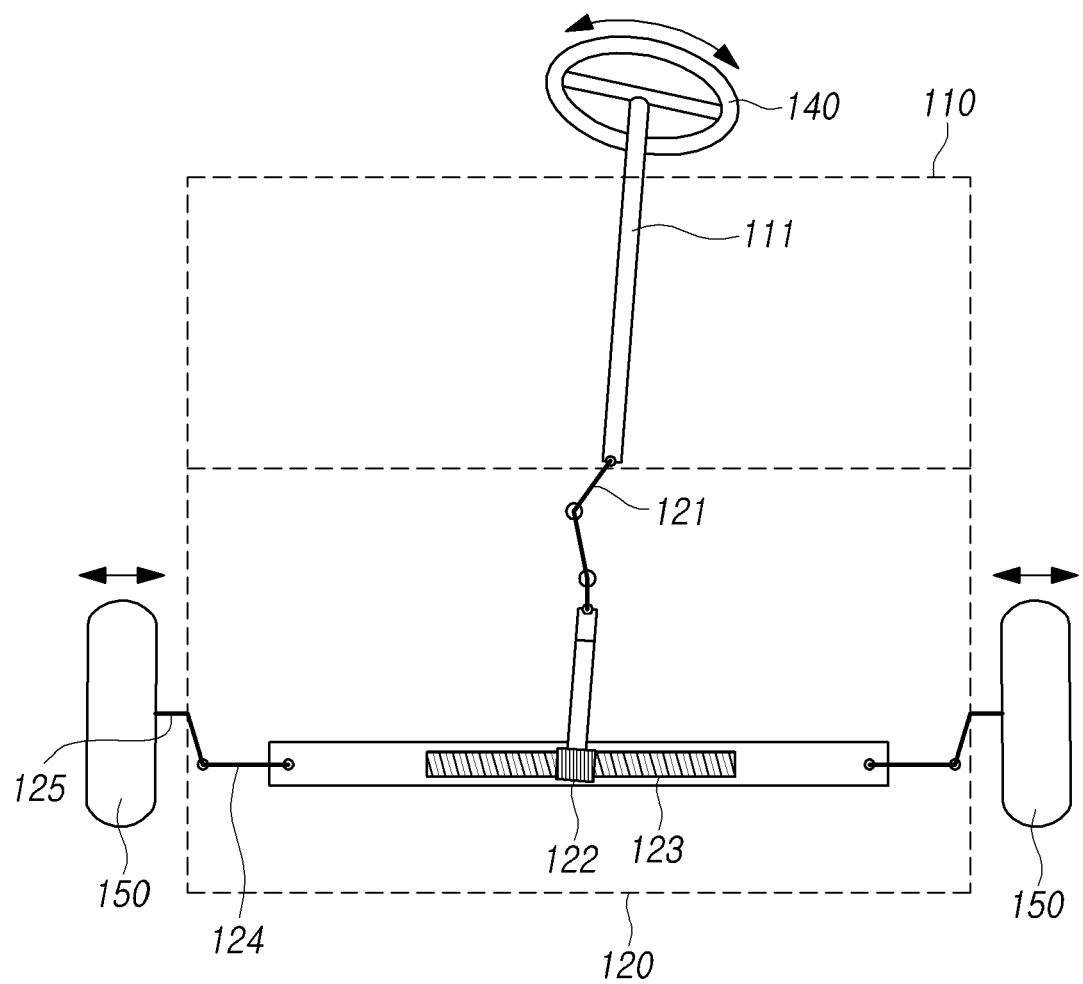

FIGS. 2 and 3 are views illustrating a steering device according to the present embodiments.

Referring to FIG. 2, according to the present embodiments, a steering device 100 may include a steering device in a form in which an input-side mechanism 110 and an output-side mechanism 120 are mechanically connected.

In other words, according to the present embodiments, the steering device 100 may include at least one of the input-side mechanism 110 connected with the steering wheel 140 or the output-side mechanism 120 mechanically connected with the input-side mechanism 110 and connected with the wheel 150.

The input-side mechanism 110 may include a steering shaft 111 connected to the steering wheel 140 but, without limitations thereto, may include any mechanism (or device) that may rotate in the rotational direction of the steering wheel or in the direction opposite to the rotational direction of the steering wheel.

The output-side mechanism 120 may include at least one of a universal joint 121, a pinion 122, a rack 123, a tie rod 124, or a knuckle arm 125 but, without limitations thereto, may include any mechanism (or device) that may change the steering angle (or movement) of the wheel.

Referring to FIG. 3, according to the present embodiments, a steering device 100 may include a steering device in a form in which an input-side mechanism 110 and an output-side mechanism 120 are electrically connected. In other words, according to the present embodiments, the steering device 100 may include a steer by wire (SbW) steering device.

In other words, according to the present embodiments, the steering device 100 may include at least one of the input-side mechanism 110 connected with the steering wheel 140 or the output-side mechanism 120 mechanically separated from the input-side mechanism 110 and connected with the wheel 150.

The input-side mechanism 110 may include a steering shaft 111 connected to the steering wheel 140 but, without limitations thereto, may include any mechanism (or device)

that may rotate in the rotational direction of the steering wheel or in the direction opposite to the rotational direction of the steering wheel.

The output-side mechanism 120 may include at least one of a pinion 122, a rack 123, a tie rod 124, or a knuckle arm 125 but, without limitations thereto, may include any mechanism (or device) that may change the steering angle (or movement) of the wheel.

Meanwhile, according to the present embodiments, the steering device 100 may include a steering device in a form in which the input-side mechanism 110 and the output-side mechanism 120 are connected with the separation/connection mechanism 130. In other words, according to the present embodiments, the steering device 100 may include a steer by wire (SbW) steering device including a clutch.

In other words, according to the present embodiments, the steering device 100 may include at least one of the input-side mechanism 110 connected with the steering wheel 140, the output-side mechanism 120 mechanically separated from the input-side mechanism 110 and connected with the wheel 150, or the separation/connection mechanism 130 mechanically and/or electrically connecting and/or separating the input-side mechanism 110 and the output-side mechanism 120.

Figure 4:
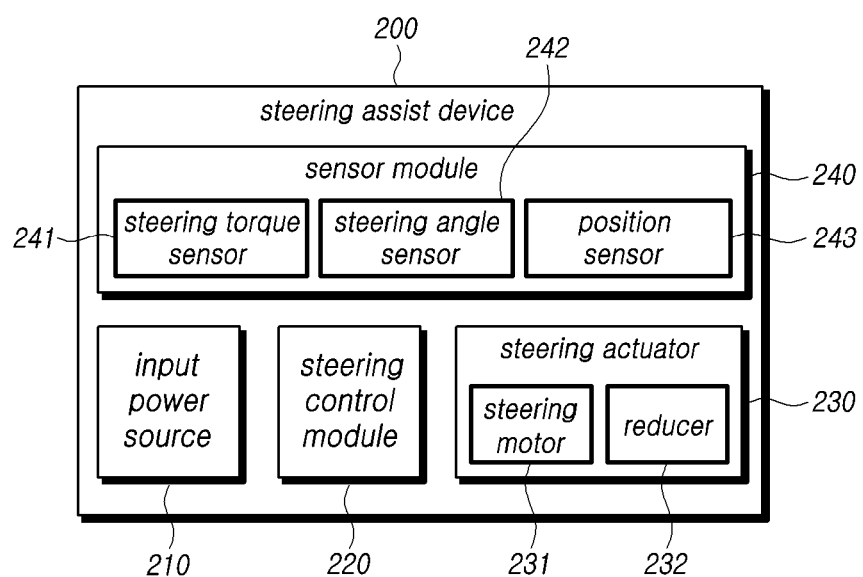
FIG. 4 is a block diagram illustrating a configuration of a steering assist device according to the present embodiments.

FIG. 4 is a block diagram illustrating a configuration of a steering assist device according to the present embodiments.

Referring to FIG. 4, according to the present embodiments, a steering assist device 200 may be connected with at least one of the input-side mechanism 110, the output-side mechanism 120, or the separation/connection mechanism 130. The steering assist device 200 may assist and/or control at least one of the input-side mechanism 110, the output-side mechanism 120, or the separation/connection mechanism 130.

For example, the steering assist device 200 may provide an assist steering force to at least one of the input-side mechanism 110 or the output-side mechanism 120. Further, the steering assist device 200 may control the separation/connection mechanism 130 and, based thereupon, provide an assist steering force to at least one of the input-side mechanism 110 or the output-side mechanism 120.

The steering assist device 200 may include at least one of an input power source 210, a steering control module 220, a steering actuator 230, or a sensor module 240.

The input power source 210, the steering control module 220, the steering actuator 230, and the sensor module 240 may be connected by at least one of an electrical, magnetic, or mechanical connection. There may be provided one or more input power sources 210, one or more steering control modules 220, one or more steering actuators 230, and one or more sensor modules 240.

The input power source 210 may include at least one of a direct current (DC) power source or an alternating current (AC) power source. The DC power source may include a battery but, without limitations thereto, may include any power source may provide DC power.

The steering control module 220 may control the operation of at least one of the input power source 210, the steering actuator 230, or the sensor module 240.

For example, the steering control module 220 may be connected with the input power source 210. The steering control module 220 may receive electric energy from the input power source 210 and filter noise included in the electric energy.

Here, the electric energy may include at least one of current, voltage, or power but, without limitations thereto, the electric energy may include any energy related to electricity.

The steering control module 220 may generate a steering motor control signal based on information (e.g., at least one of the steering torque information, steering angle information, position information, or vehicle speed information) received from each component in the steering system 1 and/or the vehicle.

The steering control module 220 may convert the filtered electric energy according to the steering motor control signal to thereby generate an assist steering force and control the steering actuator 230 (or steering motor 231) based on the assist steering force.

The steering actuator 230 may be connected with the steering control module 220. The steering actuator 230 may operate based on the assist steering force provided from the steering control module 220, assisting the steering device 100 in steering.

The steering actuator 230 may include at least one of a steering motor 231 or a reducer 232 but, without limitations thereto, the steering actuator 230 may include any mechanism (or device) that may assist the steering device in steering.

There may be provided one or more steering motors 231 or one or more reducers 232. At least one of the steering motor 231 or the reducer 232 may be connected with the steering control module 220.

If the steering actuator 230 includes the steering motor 231, the steering motor 231 may operate based on the assist steering force provided from the steering control module 220, assisting the steering device 100 in steering.

If the steering actuator 230 includes the steering motor 231 and the reducer 232, the steering motor 231 may operate based on the assist steering force provided from the steering control module 220, and the reducer 232 may operate according to the operation of the steering motor 231 to thereby assisting the steering device 100 in steering.

The steering motor 231 may include at least one of a single winding-type steering motor or a dual winding-type steering motor but, without limitations thereto, may include any motor that may assist the steering device in steering.

The steering motor 231 may include at least one of a single-phase type motor, a three-phase type motor, or a five-phase type motor but, without limitations thereto, may include any motor that may assist the steering device in steering.

The steering motor 231 may include at least one of a DC motor or an AC motor (e.g., a synchronous motor and/or an induction motor) but, without limitations thereto, may include any motor that may assist the steering device in steering.

The sensor module 240 may include at least one sensor. Here, the sensor may include at least one of a steering torque sensor 241, a steering angle sensor 242, or a position sensor 243 but, without limitations thereto, may include any sensor capable of measuring the state of the vehicle and the steering state of the vehicle.

There may be provided one or more steering torque sensors 241. The steering torque sensor 241 may measure the steering torque of the steering wheel to obtain steering torque information about the steering wheel, and provide the steering torque information about the steering wheel to the steering control module 220.

There may be provided one or more steering angle sensors 242. The steering angle sensor 242 may measure the steering angle of the steering wheel to obtain steering angle information about the steering wheel, and provide the steering angle information about the steering wheel to the steering control module 220.

There may be provided one or more position sensors 243. The position sensor 243 may measure at least one of the position of the input-side mechanism, the position of the output-side mechanism, or the position of the steering motor to thereby obtain at least one of position information about the input-side mechanism, position information about the output-side mechanism, or position information about the steering motor and may provide at least one of the position information about the input-side mechanism, the position information about the output-side mechanism, or the position information about the steering motor to the steering control module 220.

The steering torque sensor 241, the steering angle sensor 242, and the position sensor 243 may be included in the sensor module as illustrated in the drawings but, without limitations thereto, may be included in at least one of the input-side mechanism 110, the output-side mechanism 120, the separation/connection mechanism 130, the steering wheel 140, the wheel 150, the input power source 210, the steering control module 220, or the steering actuator 230 (steering motor 231 or reducer 232) or may be separately positioned.

Figure 5:
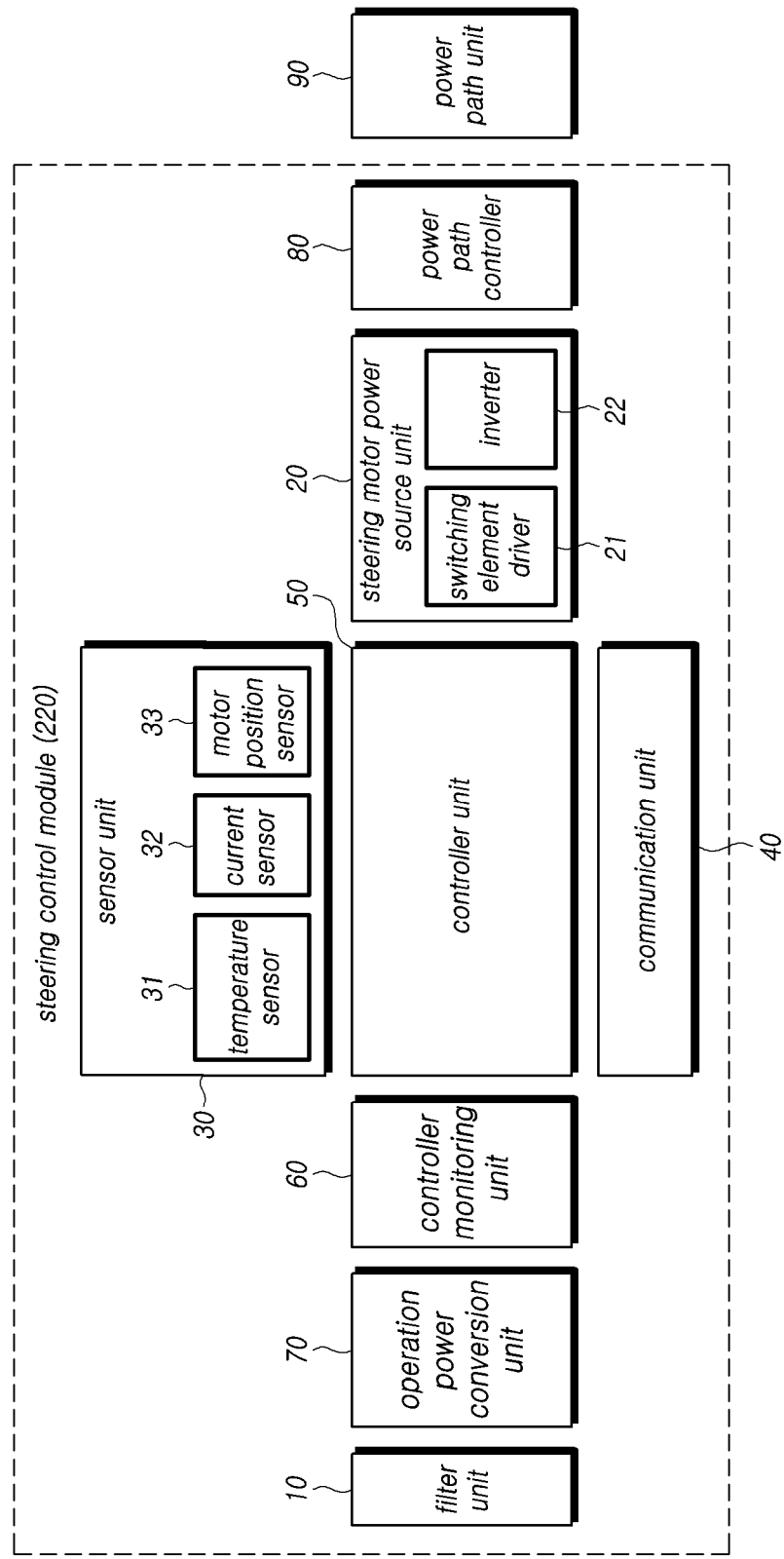
FIG. 5 is a block diagram illustrating a configuration of a steering control module according to the present embodiments.

FIG. 5 is a block diagram illustrating a configuration of a steering control module according to the present embodiments.

Referring to FIG. 5, according to the present embodiments, the steering control module 220 may include at least one of a filter unit 10, a steering motor power source unit 20, a sensor unit 30, a communication unit 40, a controller unit 50, a controller monitoring unit 60, an operation power conversion unit 70, or a power path controller 80.

The filter unit 10, the steering motor power source unit 20, the sensor unit 30, the communication unit 40, the controller unit 50, the controller monitoring unit 60, the operation power conversion unit 70, and the power path controller 80 may be connected by at least one of an electrical, magnetic, or mechanical connection.

There may be provided one or more filter units 10. The filter unit 10 may be connected to the input power source 210. The filter unit 10 may filter noise included in electric energy provided from the input power source 210 and provide the filtered electric energy to the steering motor power source unit 20 and the operation power conversion unit 70.

There may be provided one or more steering motor power source units 20. The steering motor power source unit 20 may be connected with the filter unit 10 and may receive filtered electric energy from the filter unit 10.

The steering motor power source unit 20 may be connected with the controller unit 50 and may receive a steering motor control signal from the controller unit 50. The steering motor power source unit 20 may generate an assist steering force by converting the filtered electric energy based on the steering motor control signal, and control the steering motor 231 based on the assist steering force.

The steering motor power source unit 20 may include at least one of a switching element driver 21 or an inverter 22.

The switching element driver 21 and the inverter 22 may be connected by at least one of an electrical, magnetic, or mechanical connection. There may be provided one or more switching element drivers 21 or one or more inverters 22.

The switching element driver 21 may receive the steering motor control signal from the controller unit 50, generate a switching element control signal based on the steering motor control signal, and provide the switching element control signal to the inverter 22.

The inverter 22 may convert the filtered electric energy of the filter unit 10 according to the switching element control signal, generating an assist steering force.

The inverter 22 may include a switch and/or a transistor but, without limitations thereto, may include any element (or device) that may generate an assist steering force by converting the electric energy according to the switching element control signal.

If the inverter 22 includes a field effect transistor (FET), the switching element driver 21 may be a gate driver. Accordingly, the gate driver may receive the steering motor control signal from the controller unit 50, generate a gate control signal based on the steering motor control signal, and provide the gate control signal to the inverter 22. The inverter 22 may convert the filtered electric energy of the filter unit according to the gate control signal, generating an assist steering force.

There may be provided one or more power path controllers 80. The power path controller 80 may be positioned between the steering motor power source unit 20 and the steering actuator 230, supplying or cutting off the supply of the assist steering force received from the steering motor power source unit 20 to the steering actuator 230.

Specifically, the power path controller 80 may be positioned between the inverter 22 and the steering motor 231, supplying or cutting off the supply of the assist steering force received from the inverter 22 to the steering motor 231.

The power path controller 80 may include at least one phase disconnector (PCO). The phase disconnector is an element or circuit capable of cutting off a phase, and may include at least one of a switch, a circuit breaker, a disconnecting switch, or a transistor but, without limitations thereto, may include any element or circuit that may cut off a phase.

There may be provided one or more power path units 90. The power path unit 90 may be positioned between the steering motor power source unit 20 and the steering actuator 230 to connect them, thereby providing a power path for flowing the assist steering force from the steering motor power unit 20 to the steering actuator 230.

Specifically, the power path unit 90 may be positioned between the inverter 22 and the steering motor 231 to connect them, thereby providing a power path for flowing the assist steering force from the inverter 22 to the steering motor 231.

Meanwhile, the power path controller 80 may be positioned on the power path unit 90. Thus, the power path controller 80 may control the power path of the power path unit 90, supplying or cutting off the supply of the assist steering force received from the steering motor power source unit 20 (or inverter 22) to the steering actuator 230 (or steering motor 231).

The sensor unit 30 may include at least one of a temperature sensor 31, a current sensor 32, or a motor position sensor 33 but, without limitations thereto, may include any sensor that may measure the state of the steering system (or the steering control module).

There may be provided one or more temperature sensors 31, one or more current sensors 32, or one or more motor position sensors 33.

The temperature sensor 31 may measure the temperature of the steering control module 220 to thereby obtain temperature information, and provide the temperature information to the controller unit 50.

The current sensor 32 may measure the assist current (or assist steering force) provided from the steering motor power source unit 20 to the steering actuator 230 (or the steering motor 231) to thereby obtain assist current information, and provide the assist current information to the controller unit 50.

The motor position sensor 33 may measure the position of the steering motor to obtain position information about the steering motor and may provide the position information about the steering motor to the controller unit 50. The motor position sensor 33 may be included in the steering control module 220 but, without being limited thereto, the motor position sensor 33 may be separately provided.

There may be provided one or more communication units 40. The communication unit 40 may include at least one of an internal communication unit or an external communication unit. When there are a plurality of steering control modules, the internal communication unit may be connected with other steering control modules to receive or provide information. The external communication unit may be connected with the vehicle to receive vehicle state information (e.g., vehicle speed information) from the vehicle or provide information related to the steering system to the vehicle.

There may be provided one or more controller units 50. The controller unit 50 may be connected with each component of the steering control module 220 to provide or receive information and, based thereupon, control the operation for each component of the steering control module 220.

For example, the controller unit 50 may generate a steering motor control signal based on at least one of the steering torque information about the steering wheel, steering angle information about the steering wheel, temperature information, assist current information, position information (position information about the input-side mechanism, position information about the output-side mechanism, and position information about the steering motor), vehicle state information (e.g., vehicle speed information), state information about the input power source, short circuit (or overcurrent) state information, current sensing information about the filter unit, or state information about the steering motor, and provide the steering motor control signal to the steering motor power source unit 20 (or switching element driver 21), or may generate a separation/connection control signal (e.g., a clutch control signal) and provide the separation/connection control signal to the separation/connection mechanism.

The controller unit 50 may include a microcontroller but, without limitations thereto, may include any device (or computer) that may process (or execute or compute) programs.

The controller monitoring unit 60 may be connected with the controller unit 50. The controller monitoring unit 60 may monitor the operating state of the controller unit 50. For example, the controller unit 50 may provide a watchdog signal to the controller monitoring unit 60. The controller monitoring unit 60 may be cleared based on the watchdog signal received from the controller unit 50 or may generate a reset signal and provide the reset signal to the controller unit 50.

The controller monitoring unit 60 may include a watchdog but, without limitations thereto, may include any device capable of monitoring the controller unit. In particular, a watchdog may include a window watchdog having a deadline, that is, a start and an end.

The operation power conversion unit 70 may be connected with the filter unit 10. The operation power conversion unit 70 may generate an operating voltage for each component of the steering control module 220 by converting the filtered electric energy of the filter unit 10.

The operation power conversion unit 70 may include at least one of a DC-DC converter or a regulator but, without limitations thereto, may include any device that may convert the filtered electric energy to thereby generate an operating voltage for each component of the steering control module and/or for the outside of the steering control module.

The steering control module 220 may include an electronic control unit (ECU) but, without limitations thereto, may include any controller (or system) that may perform electronic control.

The steering actuator 230 may be positioned on any one of the input-side mechanism 110 and the output-side mechanism 120 to assist them.

For example, if the steering actuator 230 is positioned on the steering shaft 111 of the input-side mechanism 110, the steering system according to the present embodiments may be of a C-EPS type and, if the steering actuator 230 is positioned on the rack 123 of the output-side mechanism 120, the steering system according to the present embodiments may be of an R-EPS type. If the steering actuator 230 is positioned on the pinion 122 of the output-side mechanism 120, the steering system according to the present embodiments may be of a P-EPS type.

There may be provided one or more steering assist devices 200.

For example, if two steering assist devices 200 are provided, the steering assist devices 200 may include an input-side steering assist device and an output-side steering assist device.

The input-side steering assist device may be connected with the input-side mechanism by at least one of electrical, magnetic or mechanical connection. The input-side steering assist device may assist the input-side mechanism.

The output-side steering assist device may be connected with the output-side mechanism by at least one of electrical, magnetic or mechanical connection. The output-side steering assist device may assist the output-side mechanism.

Since each of the input-side steering assist device and the output-side steering assist device may be understood as the same component as the above-described steering assist device, it may perform all of the above-described functions of the steering assist device and may include all of the components of the steering assist device.

For example, the input-side steering assist device may include at least one of an input-side input power source, an input-side steering control module, an input-side steering actuator, or an input-side sensor module. The input-side input power source may include at least one of an input-side direct current (DC) power source or an input-side alternating current (AC) power source. The input-side steering control module may include at least one of an input-side filter unit, an input-side steering motor power source unit, an input-side sensor unit, an input-side communication unit, an input-side controller unit, an input-side controller monitoring unit, an input-side operation power conversion unit, or an input-side power path controller. The input-side steering motor power source unit may include at least one of an input-side switching element driver or an input-side inverter. The input-side sensor unit may include at least one of an input-side temperature sensor, an input-side current sensor, or an input-side motor position sensor. The input-side steering actuator may include at least one of an input-side steering motor or an input-side reducer. The input-side sensor module may include at least one of an input-side steering torque sensor, an input-side steering angle sensor, or an input-side position sensor.

For example, the output-side steering assist device may include at least one of an output-side input power source, an output-side steering control module, an output-side steering actuator, or an output-side sensor module. The output-side input power source may include at least one of an output-side direct current (DC) power source or an output-side alternating current (AC) power source. The output-side steering control module may include at least one of an output-side filter unit, an output-side steering motor power source unit, an output-side sensor unit, an output-side communication unit, an output-side controller unit, an output-side controller monitoring unit, an output-side operation power conversion unit, or an output-side power path controller. The output-side steering motor power source unit may include at least one of an output-side switching element driver or an output-side inverter. The output-side sensor unit may include at least one of an output-side temperature sensor, an output-side current sensor, or an output-side motor position sensor. The output-side steering actuator may include at least one of an output-side steering motor or an output-side reducer. The output-side sensor module may include at least one of an output-side steering torque sensor, an output-side steering angle sensor, or an output-side position sensor.

The input-side sensor module may include at least one of a steering torque sensor, a steering angle sensor, or an input-side position sensor, and the output-side sensor module may include an output-side position sensor.

The input-side input power source and the output-side input power source may be formed as a single unit.

Each of all of the components included in each of the steering assist device, the input-side steering assist device, and the output-side steering assist device may be configured in duplicate.

Figure 6:
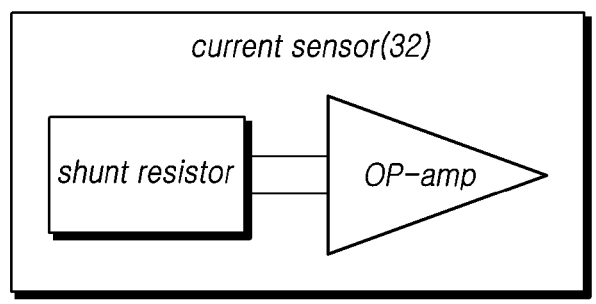
FIGS. 6 and 7 are block diagrams illustrating a configuration of a current sensor according to the present embodiments.
Figure 7:
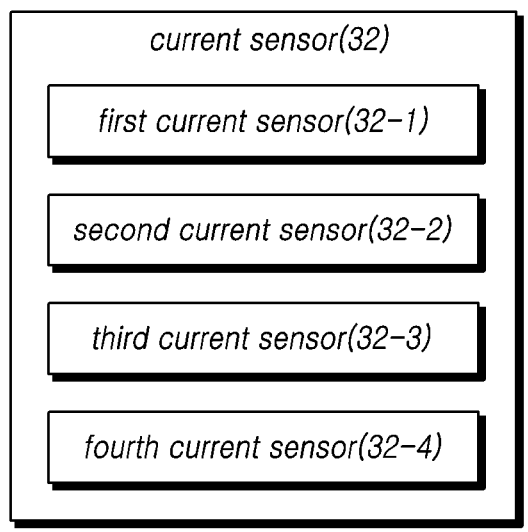

FIGS. 6 and 7 are block diagrams illustrating a configuration of a current sensor according to the present embodiments.

Referring to FIG. 6, according to the present embodiments, a current sensor 32 may measure current, obtaining current information.

The current sensor 32 may obtain current information based on a shunt resistor. In other words, the current sensor 32 may detect the potential difference (or voltage drop) across the shunt resistor and obtain current information related to the current flowing through the shunt resistor by Ohm's law.

For example, the current sensor 32 may include a shunt resistor and may further include an operational amplifier (OP-AMP).

The operational amplifier may amplify a voltage (or a current).

The current information may include a current value but, without limitations thereto, the current information may include any information that is related to current.

The current information may be obtained by the current sensor 32 but, without limitations thereto, be obtained by the controller unit 50 of the steering control module 220.

Referring to FIG. 7, according to the present embodiments, the current sensor 32 may include at least one current sensor of a first current sensor 32-1 to a fourth current sensor 32-4. The first current sensor 32-1 to the fourth current sensor 32-4 each may measure current, obtaining current information.

The first current sensor 32-1 may include a first shunt resistor and may further include a first operational amplifier.

The second current sensor 32-2 may include a second shunt resistor and may further include a second operational amplifier.

The third current sensor 32-3 may include a third shunt resistor and may further include a third operational amplifier.

The fourth current sensor 32-4 may include a fourth shunt resistor and may further include a fourth operational amplifier.

Referring to FIGS. 1 to 7, according to the present embodiments, the steering assist device 200 may include a first current sensor 32-1 obtaining a first current value, a second current sensor 32-2 obtaining a second current value, a third current sensor 32-3 obtaining a third current value, a fourth current sensor 32-4 obtaining a fourth current value, and a controller unit 50 determining the state of at least one current sensor of the first current sensor 32-1 to the fourth current sensor 32-4 based on at least one current value of the first current value to the fourth current value and controlling the steering motor according to the result of the determination. The first current sensor 32-1 and the second current sensor 32-2, respectively, may be positioned on two power paths among three power paths respectively connecting the three legs of the inverter with the three phases of the steering motor, and the third current sensor 32-3 and the fourth current sensor 32-4, respectively, may be positioned on the two legs of the inverter connected with the two power paths where the first current sensor 32-1 and the second current sensor 32-2 are respectively positioned.

Specifically, the first current sensor 32-1 may measure a first current, obtaining first current information.

The second current sensor 32-2 may measure a second current, obtaining second current information.

The third current sensor 32-3 may measure a third current, obtaining third current information.

The fourth current sensor 32-4 may measure a fourth current, obtaining fourth current information.

The first current sensor 32-1 and the second current sensor 32-2, respectively, may be positioned on two power paths of the three power paths respectively connecting the three phases of the steering motor and the three legs of the inverter.

The third current sensor 32-3 and the fourth current sensor 32-4, respectively, may be positioned on the two legs of the inverter connected with the two power paths where the first current sensor 32-1 and the second current sensor 32-2, respectively, are positioned.

The controller unit 50 may be connected with the first current sensor 32-1 to the fourth current sensor 32-4. The controller unit 50 may receive the first to fourth current information from the first current sensor 32-1 to the fourth current sensor 32-4.

The first current information may include the first current value, the second current information may include the second current value, the third current information may include the third current value, and the fourth current information may include the fourth current value. However, without limitations thereto, any information that is related to current may be included.

The controller unit 50 may determine the state of at least one current sensor of the first current sensor 32-1 to the fourth current sensor 32-4 based on at least one current value of the first current value to the fourth current value. The controller unit 50 may control the steering motor according to the result of determining the state of at least one current sensor of the first current sensor 32-1 to the fourth current sensor 32-4.

The third current sensor 32-3 may be positioned on a leg of the inverter connected with the power path where the first current sensor 32-1 is positioned, and the fourth current sensor 32-4 may be positioned on a leg of the inverter connected with the power path where the second current sensor 32-2 is positioned.

Thus, the controller unit 50 may compare the first current value and the third current value and determine the state of at least one current sensor of the first current sensor 32-1 or the third current sensor 32-3 according to the result of the comparison.

The controller unit 50 may compare the second current value and the fourth current value and determine the state of at least one current sensor of the second current sensor 32-2 and the fourth current sensor 32-4 according to the result of the comparison.

For example, the controller unit 50 may compare the difference value between the first current value and the third current value with a preset normal current difference value.

If the difference value between the first current value and the third current value is the preset normal current difference value or less, the controller unit 50 may determine that the first current sensor 32-1 and the third current sensor 32-3 are in a normal state.

If the difference value between the first current value and the third current value is more than the preset normal current difference value, the controller unit 50 may determine that the first current sensor 32-1 and the third current sensor 32-3 are in an abnormal state.

The preset normal current difference value may be a reference value (or reference range) for determining the normal or abnormal state of the first current sensor 32-1 and the third current sensor 32-3, and changes may be made thereto.

For example, the controller unit 50 may compare the difference value between the second current value and the fourth current value with a preset normal current difference value.

If the difference value between the second current value and the fourth current value is the preset normal current difference value or less, the controller unit 50 may determine that the second current sensor 32-2 and the fourth current sensor 32-4 are in a normal state.

If the difference value between the second current value and the fourth current value is more than the preset normal current difference value, the controller unit 50 may determine that the second current sensor 32-2 and the fourth current sensor 32-4 are in an abnormal state.

The preset normal current difference value may be a reference value (or reference range) for determining the normal or abnormal state of the second current sensor 32-2 and the fourth current sensor 32-4, and changes may be made thereto.

If the controller unit 50 determines that the first current sensor 32-1 to the fourth current sensor 32-4 are in the normal state, the controller unit 50 may control the steering motor based on one current value of the first current value and the third current value and one current value of the second current value and the fourth current value, assisting steering.

If the controller unit 50 determines that the first current sensor 32-1 to the fourth current sensor 32-4 are in the abnormal state, the controller unit 50 may control the steering motor to manually operate steering.

"Manually operate steering" may mean stopping assist by the steering motor and performing only steering by the steering wheel.

In particular, the power path where the first current sensor 32-1 to the fourth current sensor 32-4 are not positioned and the current value of the inverter leg connected with the power path may be calculated (e.g., Ohm's law and/or Kirchhoff's law) based on one current value of the first current value and the third current value and one current value of the second current value and the fourth current value. Accordingly, upon determining that the first current sensor 32-1 to the fourth current sensor 32-4 are in the normal or abnormal state, the controller unit may control the steering motor based on one current value of the first current value and the third current value, one current value of the second current value and the fourth current value, the power path where the first current sensor 32-1 to the fourth current sensor 32-4 are not positioned, and one current value of the current values of the inverter legs connected with the power paths.

The controller unit 50 may select the first current sensor 32-1 and the second current sensor 32-2 as primary current sensors. The controller unit 50 may select the third current sensor 32-3 and the fourth current sensor 32-4 as redundant current sensors.

The controller unit 50 may compare the first current value and the third current value, determine the state of the first current sensor according to the result of the comparison, compare the second current value and the fourth current value, and determine the state of the second current sensor according to the result of the comparison.

In other words, the controller unit 50 may compare the difference value between the first current value and the third current value with a preset normal current difference value and, if the difference value between the first current value and the third current value is the preset normal current difference value or less, determine that the first current sensor 32-1 is in the normal state and, if the difference value between the first current value and the third current value is more than the preset normal current difference value, determine that the first current sensor 32-1 is in the abnormal state.

The controller unit 50 may compare the difference value between the second current value and the fourth current value with the preset normal current difference value and, if the difference value between the second current value and the fourth current value is the preset normal current difference value or less, determine that the second current sensor 32-2 is in the normal state and, if the difference value between the second current value and the fourth current value is more than the preset normal current difference value, determine that the second current sensor 32-2 is in the abnormal state.

If the controller unit 50 determines that the first current sensor 32-1 and the second current sensor 32-2 are in the normal state, the controller unit 50 may control the steering motor based on the first current value and the second current value, assisting steering.

If the controller unit 50 determines that the first current sensor 32-1 and the second current sensor 32-2 are in the abnormal state, the controller unit 50 may control the steering motor, allowing steering to be manually operated.

If the controller unit 50 determines that the first current sensor 32-1 and the second current sensor 32-2 are in the abnormal state, the controller unit 50 may determine that the third current sensor 32-3 and the fourth current sensor 32-4 are in the normal state and, upon determining that the third current sensor 32-3 and the fourth current sensor 32-4 are in the normal state, control the steering motor based on the third current value and the fourth current value to thereby assist steering and, upon determining that the third current sensor 32-3 and the fourth current sensor 32-4 are in the abnormal state, control the steering motor to thereby allow steering to be manually operated.

Referring to FIGS. 1 to 7, according to the present embodiments, the steering assist device may include a first current sensor 32-1 obtaining a first current value, a second current sensor 32-2 obtaining a second current value, a third current sensor 32-3 obtaining a third current value, and a controller unit 50 determining the state of at least one current sensor of the first current sensor 32-1 to the third current sensor 32-3 based on at least one current value of the first current value to the third current value and controlling the steering motor according to the result of the determination. The first current sensor 32-1 and the second current sensor 32-2, respectively, may be positioned on two power paths among three power paths respectively connecting the three legs of the inverter with the three phases of the steering motor, and the third current sensor 32-3 may be positioned on the leg of the inverter connected with the other power path than the two power paths where the first current sensor 32-1 and the second current sensor 32-2 are respectively positioned.

Specifically, the first current sensor 32-1 may measure a first current, obtaining first current information.

The second current sensor 32-2 may measure a second current, obtaining second current information.

The third current sensor 32-3 may measure a third current, obtaining third current information.

The first current sensor 32-1 and the second current sensor 32-2, respectively, may be positioned on two power paths of the three power paths respectively connecting the three phases of the steering motor and the three legs of the inverter.

The third current sensor 32-3 may be positioned on the leg of the inverter connected with the other power path than the two power paths where the first current sensor 32-1 and the second current sensor 32-2, respectively, are positioned.

The controller unit 50 may be connected with the first current sensor 32-1 to the third current sensor 32-3. The controller unit 50 may receive the first to third current information from the first current sensor 32-1 to the third current sensor 32-3.

The first current information may include the first current value, the second current information may include the second current value, and the third current information may include the third current value. However, without limitations thereto, any information that is related to current may be included.

The controller unit 50 may determine the state of at least one current sensor of the first current sensor 32-1 to the third current sensor 32-3 based on at least one current value of the first current value to the third current value. The controller unit 50 may control the steering motor according to the result of determining the state of at least one current sensor of the first current sensor 32-1 to the third current sensor 32-3.

For example, the controller unit 50 may compare the total current value of the first current value to the third current value with a preset normal total current value, determine the state of the first current sensor 32-1 to the third current sensor 32-3 according to the result of the comparison, and control the steering motor according to the result of the determination.

In other words, if the total current value of the first current value to the third current value matches the present normal total current value, the controller unit 50 may determine that the first current sensor 32-1 to the third current sensor 32-3 are in the normal state. In other words, if the difference value between the total current value of the first current value to the third current value and the preset normal total current value is the preset normal total current difference value or less, the controller unit 50 may determine that the first current sensor 32-1 to the third current sensor 32-3 are in the normal state.

If the total current value of the first current value to the third current value does not match the preset normal total current value, the controller unit 50 may determine that the first current sensor 32-1 to the third current sensor 32-3 are in the abnormal state. In other words, if the difference value between the total current value of the first current value to the third current value and the preset normal total current value is more than the preset normal total current difference value, the controller unit 50 may determine that the first current sensor 32-1 to the third current sensor 32-3 are in the abnormal state.

Here, the preset normal total current value may be OA. In general, when the steering motor is normal, the sum of currents (e.g., three-phase currents) flowing through the steering motor may be OA according to Kirchhoff's law.

The preset normal total current difference value may be a reference value (or reference range) for determining the normal or abnormal state of the first current sensor 32-1 to the third current sensor 32-3 and may include the preset normal total current value plus an error range, and changes may be made thereto.

If the controller unit 50 determines that the first current sensor 32-1 to the third current sensor 32-3 are in the normal state, the controller unit 50 may control the steering motor based on one current value of the first current value to the third current value, assisting steering.

If the controller unit 50 determines that the first current sensor 32-1 to the third current sensor 32-3 are in the abnormal state, the controller unit 50 may control the steering motor to manually operate steering.

As described above, according to the present embodiments, the steering assist device may realize a redundancy current detection scheme, which may save costs and adopts a distinct current sensor sensing scheme through a current sensor redundancy scheme based on phase current detection and ground current detection, i.e., by applying both a phase current detection scheme and a ground current detection scheme, and thus assist steering, thereby enhancing the failure detection performance of the current sensor and implementing higher safety.

FIGS. 8, 9, 10, 11, 12, and 13 are views illustrating a redundancy scheme for a current sensor according to the present embodiments.

Referring to FIGS. 8 to 13, according to the present embodiments, a steering assist device 200 may include an inverter 22 and a power path unit 90.

The inverter 22 may include an Ath leg, a Bth leg, and a Cth leg.

The Ath leg may include an Ath high-side switching element A_HS and an Ath low-side switching element A_LS connected in series with each other.

The Bth leg may include a Bth high-side switching element B_HS and a Bth low-side switching element B_LS connected in series with each other.

The Cth leg may include a Cth high-side switching element C_HS and a Cth low-side switching element C_LS connected in series with each other.

The power path unit 90 may include an Ath power path A_P, a Bth power path B_P, and a Cth power path C_P.

The Ath power path A_P may connect an Ath point positioned on the Ath leg with the Ath phase of the steering motor. The Ath point positioned on the Ath leg may be a point between the Ath high-side switching element A_HS and the Ath low-side switching element A_LS.

The Bth power path B_P may connect the Bth point positioned on the Bth leg with the Bth phase of the steering motor. The Bth point positioned on the Bth leg may be a point between the Bth high-side switching element B_HS and the Bth low-side switching element B_LS.

The Cth power path C_P may connect the Cth point positioned on the Cth leg with the Cth phase of the steering motor. The Cth point positioned on the Cth leg may be a point between the Cth high-side switching element C_HS and the Cth low-side switching element C_LS.

The Ath high-side switching element A_HS, the Bth high-side switching element B_HS, and the Cth high-side switching element C_HS may be connected to the positive terminal of the power source.

The Ath low-side switching element A_LS, the Bth low-side switching element B_LS, and the Cth low-side switching element C_LS may be connected to the negative terminal of the power source and the ground.

Figure 8:
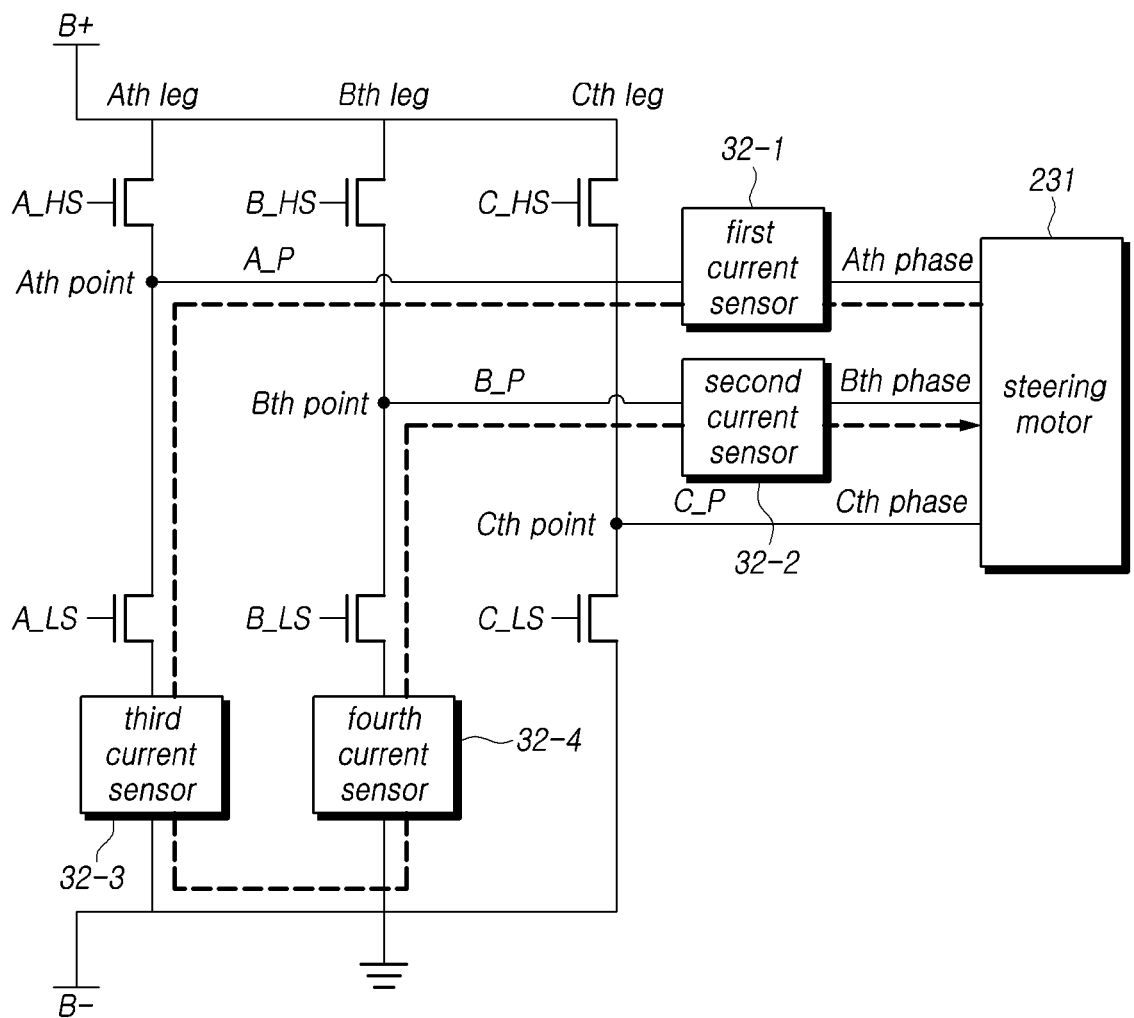
FIGS. 8, 9, 10, 11, 12, and 13 are views illustrating a redundancy scheme for a current sensor according to the present embodiments.

Referring to FIG. 8, the first current sensor 32-1 may be positioned on the Ath power path A_P to obtain a first current value.

The second current sensor 32-2 may be positioned on the Bth power path B_P to obtain a second current value.

The third current sensor 32-3 may be positioned between the Ath low-side switching element A_LS and the ground to obtain a third current value.

The fourth current sensor 32-4 may be positioned between the Bth low-side switching element B_LS and the ground to obtain a fourth current value.

The controller unit 50 may control the turn-on operation of the Ath low-side switching element A_LS and the Bth low-side switching element B_LS to form the current path (e.g., one current path) shown in the figure and control the operation of the first current sensor 32-1 to the fourth current sensor 32-4 to obtain the first to fourth current values.

Figure 9:
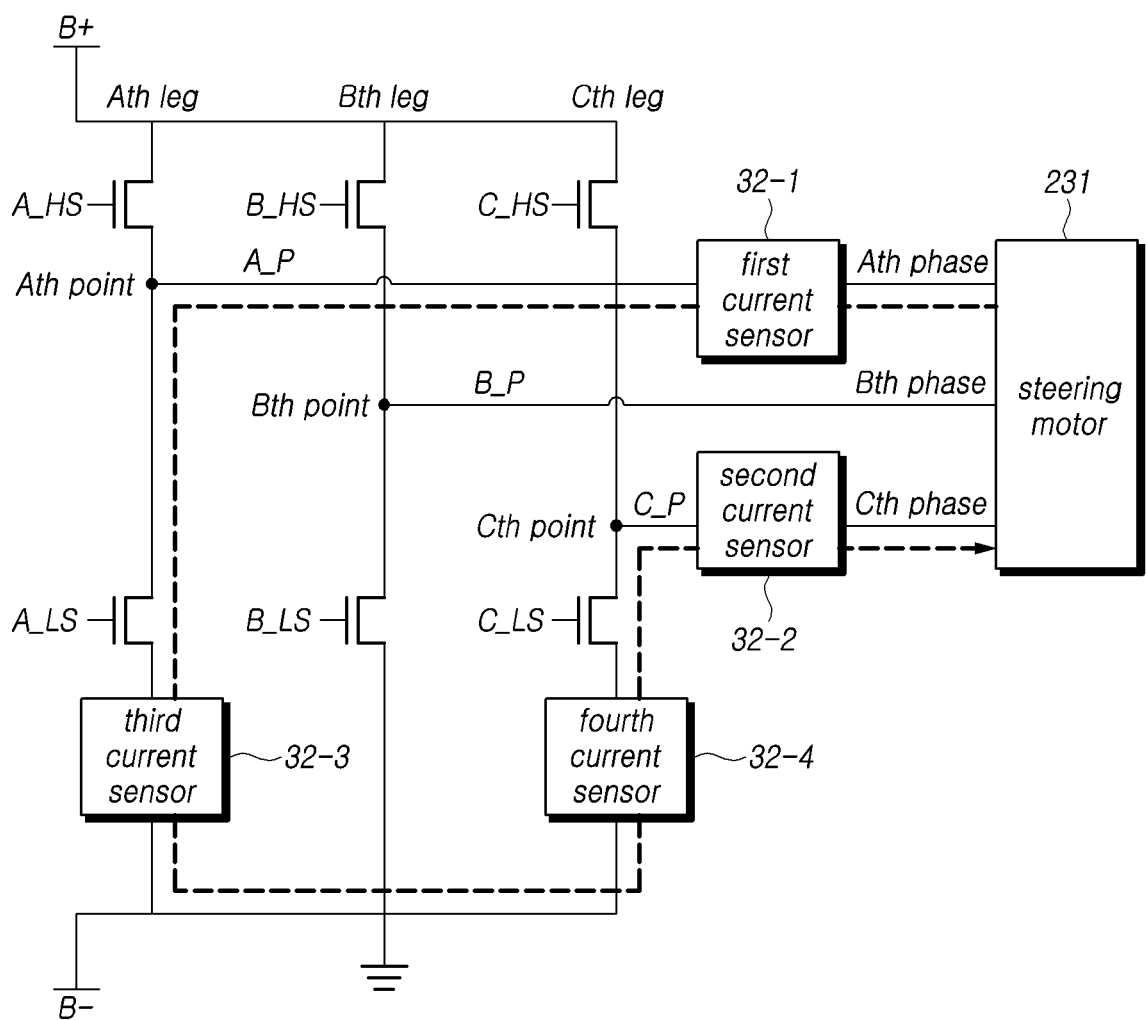

Referring to FIG. 9, the first current sensor 32-1 may be positioned on the Ath power path A_P to obtain a first current value.

The second current sensor 32-2 may be positioned on the Cth power path C_P to obtain a second current value.

The third current sensor 32-3 may be positioned between the Ath low-side switching element A_LS and the ground to obtain a third current value.

The fourth current sensor 32-4 may be positioned between the Cth low-side switching element C_LS and the ground to obtain a fourth current value.

The controller unit 50 may control the turn-on operation of the Ath low-side switching element A_LS and the Cth low-side switching element C_LS to form the current path (e.g., one current path) shown in the figure and control the operation of the first current sensor 32-1 to the fourth current sensor 32-4 to obtain the first to fourth current values.

Figure 10:
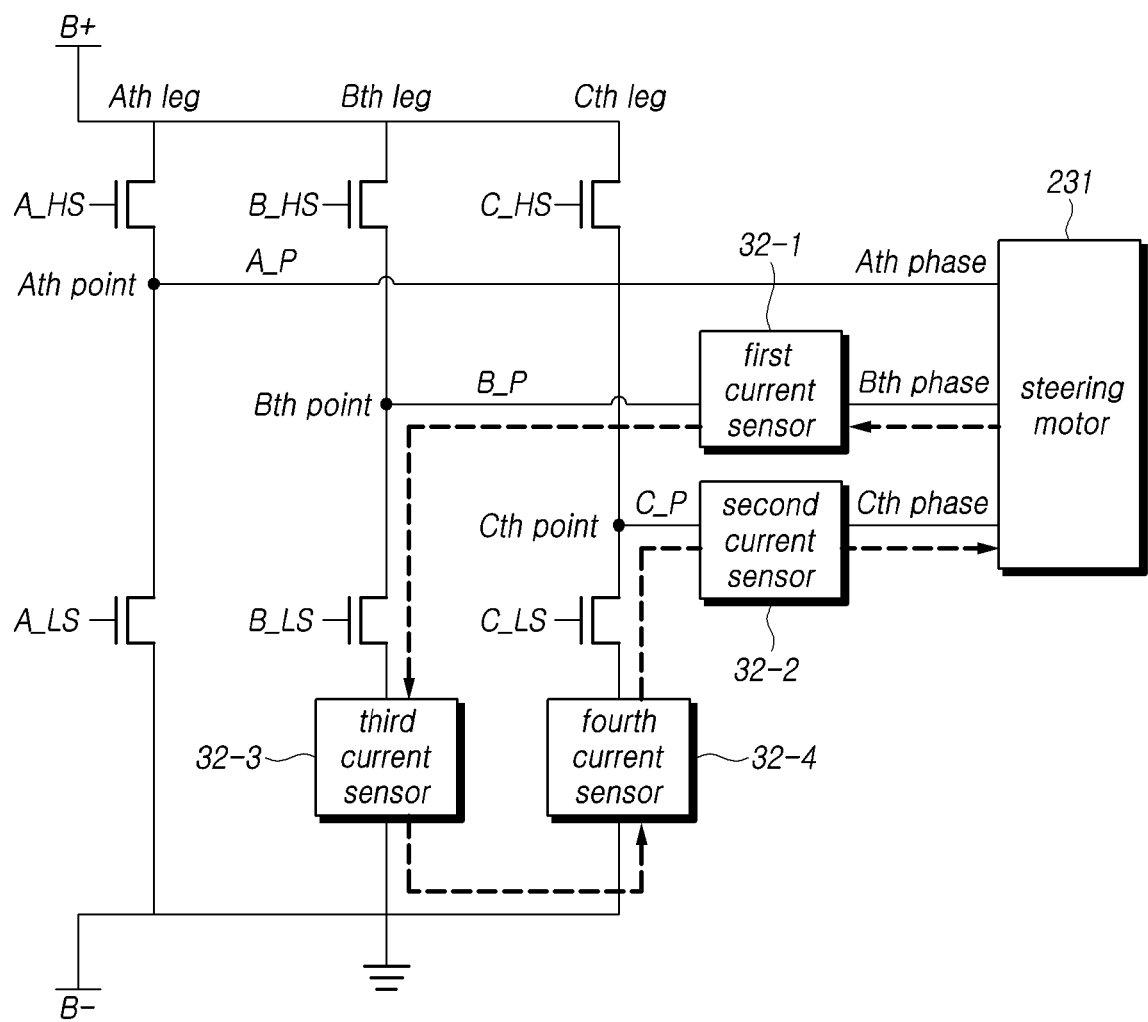

Referring to FIG. 10, the first current sensor 32-1 may be positioned on the Bth power path B_P to obtain a first current value.

The second current sensor 32-2 may be positioned on the Cth power path C_P to obtain a second current value.

The third current sensor 32-3 may be positioned between the Bth low-side switching element B_LS and the ground to obtain a third current value.

The fourth current sensor 32-4 may be positioned between the Cth low-side switching element C_LS and the ground to obtain a fourth current value.

The controller unit 50 may control the turn-on operation of the Bth low-side switching element B_LS and the Cth low-side switching element C_LS to form the current path (e.g., one current path) shown in the figure and control the operation of the first current sensor 32-1 to the fourth current sensor 32-4 to obtain the first to fourth current values.

Referring to FIGS. 8 to 10, the controller unit 50 may compare the first current value and the third current value, compare the second current value and the fourth current value, determine the abnormal state of the first current sensor 32-1 to the fourth current sensor 32-4 according to the result of the comparison, and control the steering motor based on the result of the determination. A specific method related thereto has been described above and is thus omitted below for brevity of description.

As described above, according to the present embodiments, the steering assist device may precisely detect whether the current sensor, i.e., (operational) amplifier circuit, has a failure by comparing the outputs from two current sensors positioned on the same phase, i.e., the output value of the (operational) amplifier, using a current detection method for detecting phase currents at two sites (power path current) and the ground currents at two sites (current between the low-switching element and the ground), and may compensate for four current sensors at the same time by applying one current sensor compensation process, thereby enhancing current detection and comparison characteristics.

Figure 11:
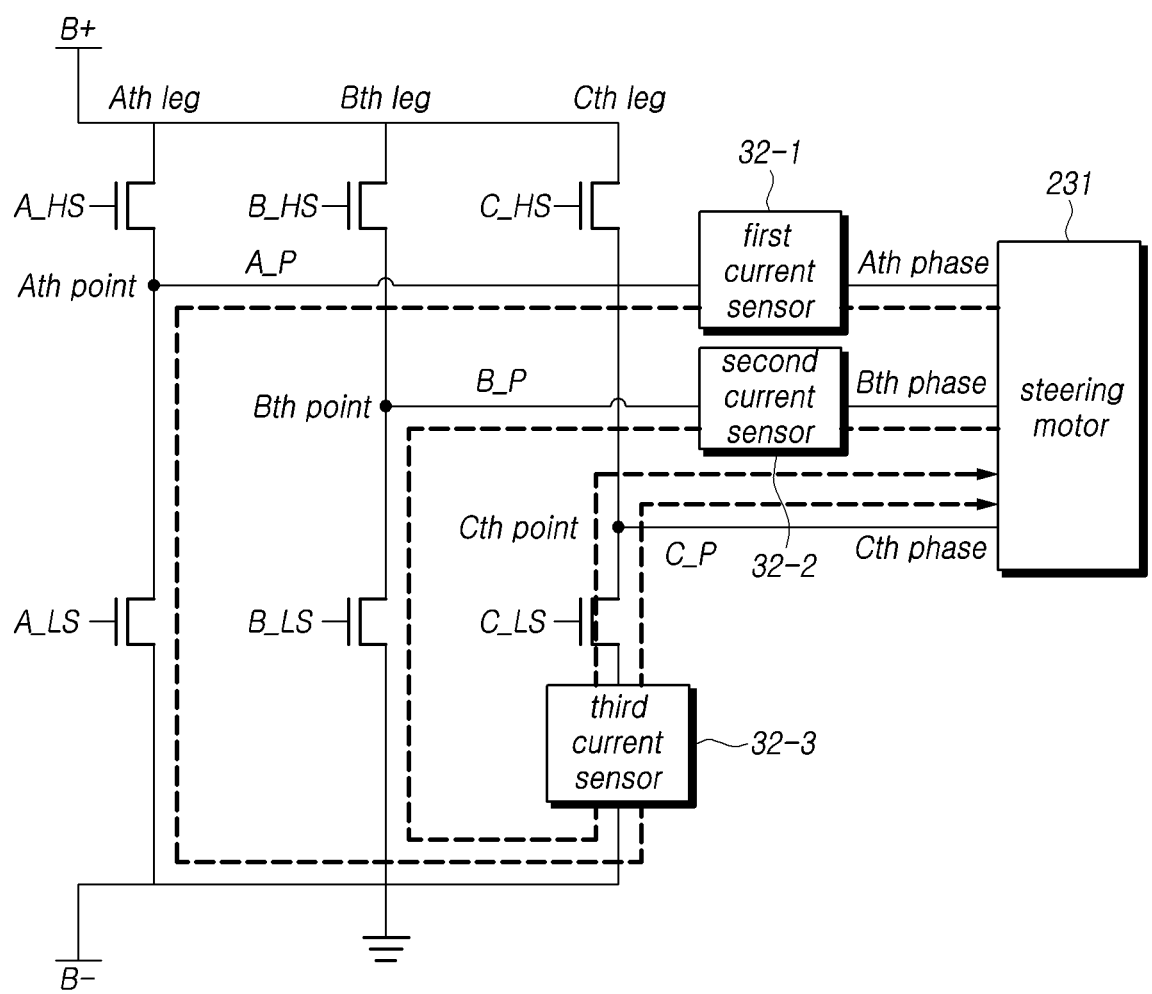

Referring to FIG. 11, the first current sensor 32-1 may be positioned on the Ath power path A_P to obtain a first current value.

The second current sensor 32-2 may be positioned on the Bth power path B_P to obtain a second current value.

The third current sensor 32-3 may be positioned between the Cth low-side switching element C_LS and the ground to obtain a third current value.

The controller unit 50 may control the turn-on operation of the Ath low-side switching element A_LS, the Bth low-side switching element B_LS, and the Cth low-side switching element C_LS to form the current path (e.g., two current paths) shown in the figure and control the first current sensor 32-1 to the third current sensor 32-3 to obtain the first to third current values.

Figure 12:
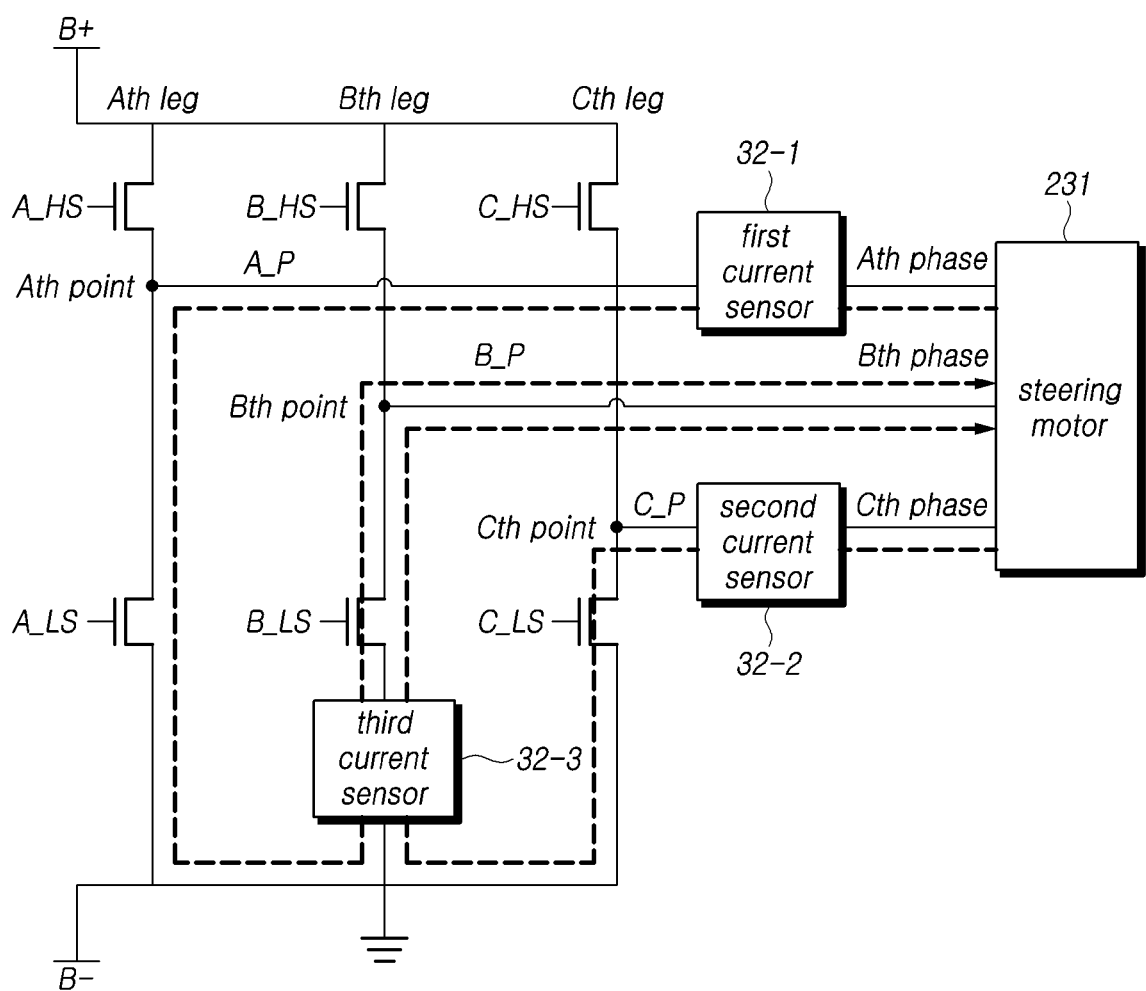

Referring to FIG. 12, the first current sensor 32-1 may be positioned on the Ath power path A_P to obtain a first current value.

The second current sensor 32-2 may be positioned on the Cth power path C_P to obtain a second current value.

The third current sensor 32-3 may be positioned between the Bth low-side switching element B_LS and the ground to obtain a third current value.

The controller unit 50 may control the turn-on operation of the Ath low-side switching element A_LS, the Bth low-side switching element B_LS, and the Cth low-side switching element C_LS to form the current path (e.g., two current paths) shown in the figure and control the first current sensor 32-1 to the third current sensor 32-3 to obtain the first to third current values.

Figure 13:
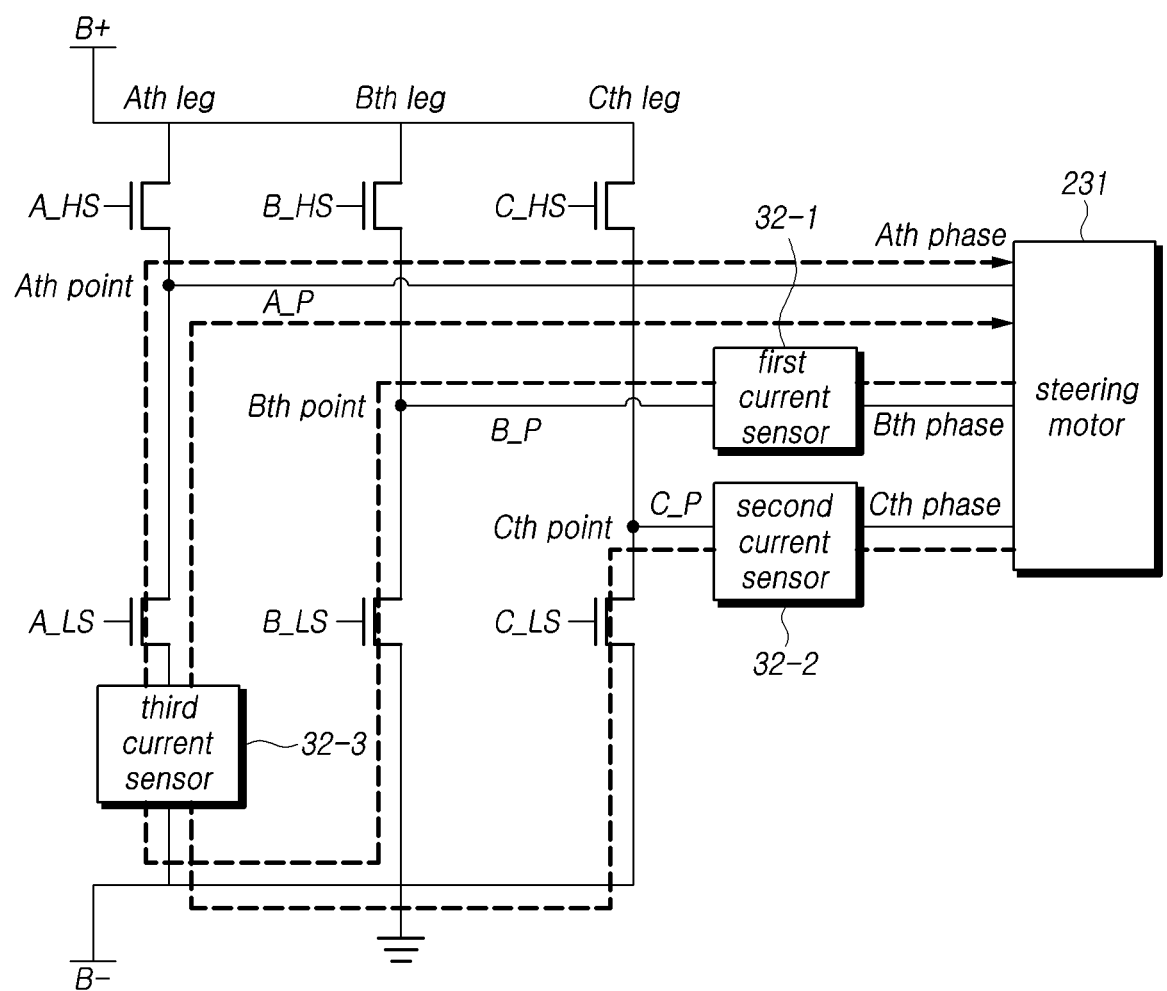

Referring to FIG. 13, the first current sensor 32-1 may be positioned on the Bth power path B_P to obtain a first current value.

The second current sensor 32-2 may be positioned on the Cth power path C_P to obtain a second current value.

The third current sensor 32-3 may be positioned between the Ath low-side switching element A_LS and the ground to obtain a third current value.

The controller unit 50 may control the turn-on operation of the Ath low-side switching element A_LS, the Bth low-side switching element B_LS, and the Cth low-side switching element C_LS to form the current path (e.g., two current paths) shown in the figure and control the first current sensor 32-1 to the third current sensor 32-3 to obtain the first to third current values.

Referring to FIGS. 11 to 13, the controller unit 50 may compare the total current value of the first current value to the third current value with a preset normal total current difference value, determine the abnormal state of the first current sensor 32-1 to the third current sensor 32-3 according to the result of the comparison, and control the steering motor based on the result of the determination. A specific method related thereto has been described above and is thus omitted below for brevity of description.

As described above, according to the present embodiments, the steering assist device may detect a failure in the current sensor, using the current detection method for detecting the phase currents (power path currents) at two sites and the ground current at one site (current between the low-side switching element and the ground) and the fact that the sum of the respective output values of the three current sensors, i.e., (operational) amplifiers, is OA, thereby allowing for precise detection as to whether the current sensor, i.e., the amplifier circuit, has a failure, while saving costs and downsizing the current sensor.

A steering assist method according to the present embodiments is described below with reference to the accompanying drawings. What overlaps the steering system and steering assist device described above in connection with FIGS. 1 to 13 according to the present embodiments is omitted from further description for brevity of description.

Figure 14:
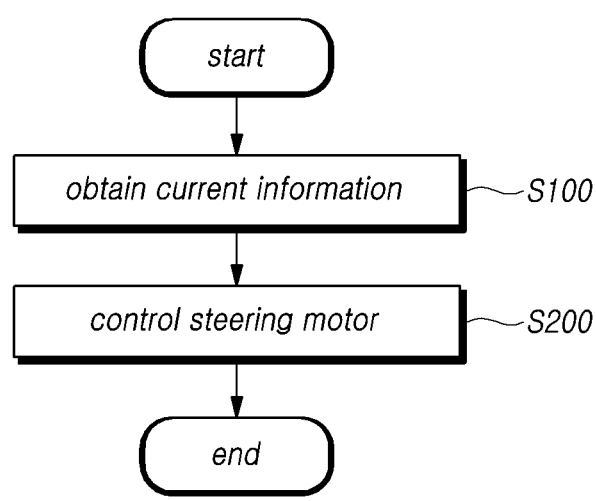
FIG. 14 is a flowchart illustrating a steering assist method according to the present embodiments.

FIG. 14 is a flowchart illustrating a steering assist method according to the present embodiments.

Referring to FIG. 14, according to the present embodiments, a steering assist method may include at least one of the step S100 of obtaining current information or the step S200 of controlling the steering motor.

The current information may be a current value.

According to the present embodiments, first to fourth current values may be obtained by the first to fourth current sensors, respectively (S100).

Then, the state of at least one current sensor of the first current sensor to the fourth current sensor may be determined based on at least one current value of the first current value to the fourth current value, and the steering motor may be controlled according to the result of the determination (S200).

Specifically, in step S100, the first current may be measured through the first current sensor, obtaining first current information. The second current may be measured through the second current sensor, obtaining second current information. The third current may be measured through the third current sensor, obtaining third current information. The fourth current may be measured through the fourth current sensor, obtaining fourth current information.

The first current sensor and the second current sensor, respectively, may be positioned on two power paths of the three power paths respectively connecting the three phases of the steering motor and the three legs of the inverter.

The third current sensor and the fourth current sensor, respectively, may be positioned on the two legs of the inverter connected with the two power paths where the first current sensor and the second current sensor, respectively, are positioned.

In step S200, the state of at least one current sensor of the first current sensor to the fourth current sensor may be determined based on at least one current value of the first current value to the fourth current value, and the steering motor may be controlled according to the result of determining the state of at least one current sensor among the first current sensor to the fourth current sensor.

The third current sensor may be positioned on a leg of the inverter connected with the power path where the first current sensor is positioned, and the fourth current sensor may be positioned on a leg of the inverter connected with the power path where the second current sensor is positioned.

In step S200, the first current value and the third current value may be compared, and the state of at least one current sensor among the first current sensor or the third current sensor may be determined according to the result of the comparison, and the second current value and the fourth current value may be compared, and the state of at least one current sensor of the second current sensor or the fourth current sensor may be determined according to the result of the comparison.

For example, in step S200, the difference value between the first current value and the third current value may be compared with a preset normal current difference value. In step S200, if the difference value between the first current value and the third current value is the preset normal current difference value or less, it may be determined that the first current sensor and the third current sensor are in the normal state. In step S200, if the difference value between the first current value and the third current value is more than the preset normal current difference value, it may be determined that the first current sensor and the third current sensor are in the abnormal state.

For example, in step S200, the difference value between the second current value and the fourth current value may be compared with a preset normal current difference value. In step S200, if the difference value between the second current value and the fourth current value is the preset normal current difference value or less, it may be determined that the second current sensor and the fourth current sensor are in the normal state. In step S200, if the difference value between the second current value and the fourth current value is more than the preset normal current difference value, it may be determined that the second current sensor and the fourth current sensor are in the abnormal state.

In step S200, if it is determined that the first current sensor to the fourth current sensor are in the normal state, the steering motor may be controlled based on one current value of the first current value and the third current value and one current value of the second current value and the fourth current value, assisting steering. In step S200, if it is determined that the first current sensor to the fourth current sensor are in the abnormal state, the steering motor may be controlled to manually operate steering.

In step S200, the first current sensor and the second current sensor may be selected as primary current sensors. In step S200, the third current sensor and the fourth current sensor may be selected as redundant current sensors.

In step S200, the difference value between the first current value and the third current value may be compared with a preset normal current difference value and, if the difference value between the first current value and the third current value is the preset normal current difference value or less, it may be determined that the first current sensor is in the normal state and, if the difference value between the first current value and the third current value is more than the preset normal current difference value, it may be determined that the first current sensor is in the abnormal state.

In step S200, the difference value between the second current value and the fourth current value may be compared with the preset normal current difference value and, if the difference value between the second current value and the fourth current value is the preset normal current difference value or less, it may be determined that the second current sensor is in the normal state and, if the difference value between the second current value and the fourth current value is more than the preset normal current difference value, it may be determined that the second current sensor is in the abnormal state.

In step S200, if it is determined that the first current sensor and the second current sensor are in the normal state, the steering motor may be controlled based on the first current value and the second current value, assisting steering. In step S200, if it is determined that the first current sensor and the second current sensor are in the abnormal state, the steering motor may be controlled to manually operate steering.

In step S200, if it is determined that the first current sensor and the second current sensor are in the abnormal state, it may be determined that the third current sensor and the fourth current sensor are in the normal state and, if it is determined that the third current sensor and the fourth current sensor are in the normal state, the steering motor may be controlled based on the third current value and the fourth current value to thereby assist steering and, if it is determined that the third current sensor and the fourth current sensor are in the abnormal state, the steering motor may be controlled to allow steering to be manually operated.

According to another embodiment, first to third current values may be obtained by the first to third current sensors, respectively (S100).

Then, the state of at least one current sensor of the first current sensor to the third current sensor may be determined based on at least one current value of the first current value to the third current value, and the steering motor may be controlled according to the result of the determination (S200).

Specifically, in step S100, the first current may be measured through the first current sensor, obtaining first current information. The second current may be measured through the second current sensor, obtaining second current information. The third current may be measured through the third current sensor, obtaining third current information.

The first current sensor and the second current sensor, respectively, may be positioned on two power paths of the three power paths respectively connecting the three phases of the steering motor and the three legs of the inverter.

The third current sensor may be positioned on the leg of the inverter connected with the other power path than the two power paths where the first current sensor and the second current sensor, respectively, are positioned.

In step S200, the state of at least one current sensor of the first current sensor to the third current sensor may be determined based on at least one current value of the first current value to the third current value, and the steering motor may be controlled according to the result of determining the state of at least one current sensor among the first current sensor to the third current sensor.

In step S200, the total current value of the first current value to the third current value may be compared with a preset normal total current value, and the state of the first current sensor to the third current sensor may be determined according to the result of the comparison.

For example, in step S200, if the difference value between the total current value of the first current value to the third current value and the preset normal total current value is the preset normal total current difference value or less, it may be determined that the first current sensor to the third current sensor are in the normal state. In step S200, if the difference value between the total current value of the first current value to the third current value and the preset normal total current value is more than the preset normal total current difference value, it may be determined that the first current sensor to the third current sensor are in the abnormal state.

In step S200, if it is determined that the first current sensor to the third current sensor are in the normal state, the steering motor may be controlled based on one current value of the first current value to the third current value, assisting steering. In step S200, if it is determined that the first current sensor to the third current sensor are in the abnormal state, the steering motor may be controlled to manually operate steering.

Figure 15:
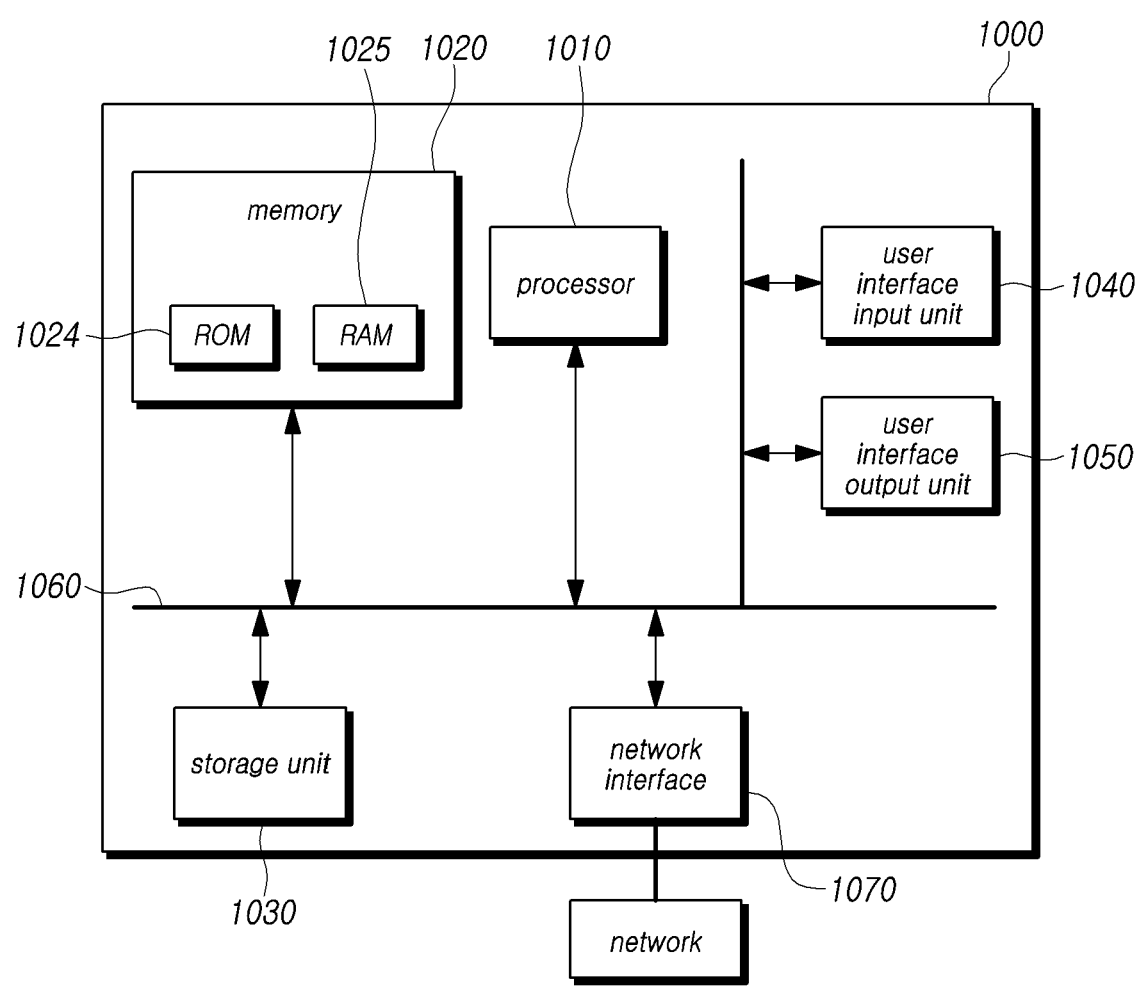
FIG. 15 is a block diagram illustrating a configuration of a computer system for a steering control device, a steering assist device, and a steering system according to the present embodiments.

FIG. 15 is a block diagram illustrating a configuration of a computer system for a steering control device (or steering control module), a steering assist device, and a steering system according to the present embodiments.

Referring to FIG. 15, the above-described embodiments may be implemented as, e.g., a computer-readable recording medium, in a computer system. As illustrated in the drawings, the computer system 1000 of the steering control device (or steering control module), steering assist device, and steering system may include at least one of one or more processors 1010, a memory 1020, a storage unit 1030, a user interface input unit 1040, and a user interface output unit 1050 which may communicate with each other via a bus 1060. The computer system 1000 may further include a network interface 1070 for connecting to a network. The processor 1010 may be a central processing unit (CPU) or semiconductor device that executes processing instructions stored in the memory 1020 and/or the storage unit 1030. The memory 1020 and the storage unit 1030 may include various types of volatile/non-volatile storage media. For example, the memory 1200 may include a read only memory (ROM) 1024 and a random access memory (RAM) 1025.

Accordingly, the embodiments may be implemented as a non-volatile computer recording medium storing computer-implemented methods or computer executable instructions. The instructions may be executed by the processor to perform a method according to the present embodiments of the disclosure. In particular, if the at least one core includes a plurality of cores, at least one of the plurality of cores may include a lockstep core.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering assist device, comprising: a first current sensor obtaining a first current value; a second current sensor obtaining a second current value; a third current sensor obtaining a third current value; a fourth current sensor obtaining a fourth current value; and a controller unit performing a first comparison between the first current value and the third current value, determining a state of at least one of the first current sensor and the third current sensor based on the first comparison, performing a second comparison between the second current value and the fourth current value, determining a state of at least one of the second current sensor and the fourth current sensor based on the second comparison, and controlling a steering motor according to results of the determinations, wherein the first and the second current sensor are positioned on first and a second power paths of three power paths respectively, with each of the three power paths individually connecting each of three legs of an inverter to each of three phases of the steering motor, wherein the third current sensor is positioned on a first leg of the three legs of the inverter, with the first leg being connected with the first power path where the first current sensor is positioned, and the fourth current sensor is positioned on a second leg of the three legs of the inverter, with the second leg being connected with the second power path where the second current sensor is positioned, wherein a switching element is positioned between the first current sensor and the third current sensor, and a second switching element is positioned between the second current sensor and the fourth current sensor.

2. The steering assist device of claim 1, wherein the controller unit:
compares a difference value between the first current value and the third current value with a preset normal current difference value, determines that the first current sensor and the third current sensor are in a normal state if the difference value between the first current value and the third current value is the preset normal current difference value or less, and determines that the first current sensor and the third current sensor are in an abnormal state if the difference value between the first current value and the third current value is more than the preset normal current difference value; and
compares a difference value between the second current value and the fourth current value with the preset normal current difference value, determines that the second current sensor and the fourth current sensor are in the normal state if the difference value between the second current value and the fourth current value is the preset normal current difference value or less, and determines that the second current sensor and the fourth current sensor are in the abnormal state if the difference value between the second current value and the fourth current value is more than the preset normal current difference value.

3. The steering assist device of claim 2, wherein the controller unit controls the steering motor to assist steering based on one of the first current value and the third current value and one of the second current value and the fourth current value if the first current sensor to the fourth current sensor are determined to be in the normal state.

4. The steering assist device of claim 2, wherein the controller unit controls the steering motor to manually operate steering if the first current sensor to the fourth current sensor are determined to be in the abnormal state.

5. The steering assist device of claim 1, wherein the controller unit selects the first current sensor and the second current sensor as primary current sensors and selects the third current sensor and the fourth current sensor as redundant current sensors.

6. The steering assist device of claim 5, wherein the controller unit determines the state of the first current sensor based on the first comparison, and determines the state of the second current sensor based on the second comparison.

7. The steering assist device of claim 6, wherein the controller unit compares a difference value between the first current value and the third current value with a preset normal current difference value, determines that the first current sensor is in a normal state if the difference value between the first current value and the third current value is the preset normal current difference value or less, and determines that the first current sensor is in an abnormal state if the difference value between the first current value and the third current value is more than the preset normal current difference value.

8. The steering assist device of claim 6, wherein the controller unit compares a difference value between the second current value and the fourth current value with a preset normal current difference value, determines that the second current sensor is in a normal state if the difference value between the second current value and the fourth current value is the preset normal current difference value or less, and determines that the second current sensor is in an abnormal state if the difference value between the second current value and the fourth current value is more than the preset normal current difference value.

9. The steering assist device of claim 1, wherein the three legs of the inverter comprise a first leg including a first high-side switching element and a first low-side switching element connected in series with each other, a second leg including a second high-side switching element and a second low-side switching element connected in series with each other, and a third leg including a third high-side switching element and a third low-side switching element connected in series with each other; and
wherein the three power paths comprise the first power path, the second power path, and a third power path, with the first power path connecting a first point on the first leg, positioned between the first high-side switching element and the first low-side switching element, to a first phase of the three phases of the steering motor, the second power path connecting a second point on the second leg, positioned between the second high-side switching element and the second low-side switching element, to a second phase of the three phases of the steering motor, and a third power path connecting a third point on the third leg, positioned between the third high-side switching element and the third low-side switching element, to a third phase of the three phases of the steering motor, wherein the first high-side switching element, the second high-side switching element, and the third high-side switching element are connected with a positive terminal of a power source, and wherein the first low-side switching element, the second low-side switching element, and the third low-side switching element are connected with a negative terminal of the power source and a ground.

10. The steering assist device of claim 9, wherein the first current sensor is positioned on the first power path, the second current sensor is positioned on the second power path, the third current sensor is positioned between the first low-side switching element and the ground, and the fourth current sensor is positioned between the second low-side switching element and the ground.

11. The steering assist device of claim 9, wherein the first current sensor is positioned on the first power path, the second current sensor is positioned on the third power path, the third current sensor is positioned between the first low-side switching element and the ground, and the fourth current sensor is positioned between the third low-side switching element and the ground.

12. The steering assist device of claim 9, wherein the first current sensor is positioned on the second power path, the second current sensor is positioned on the third power path, the third current sensor is positioned between the second low-side switching element and the ground, and the fourth current sensor is positioned between the third low-side switching element and the ground.

13. A steering assist device, comprising:
a current sensor including a first current sensor obtaining a first current value, a second current sensor obtaining a second current value, and a third current sensor obtaining a third current value; and
a controller unit calculating a sum of the first current value, the second current value, and the third current value, and comparing the sum with a preset normal total current value,
determining a state of the current sensor according to a result of the comparison, and
controlling a steering motor according to a result of the determination,
wherein the first and the second current sensors are positioned on a first and a second power paths of three power paths respectively, with each of the three power paths individually connecting each of three legs of an inverter with each of three phases of the steering motor,
wherein the third current sensor is positioned on a leg of the three legs of the inverter, the leg being connected with a third power path of the three power paths where the first and the second current sensors are not positioned,
wherein a switching element is positioned between the third current sensor and a phase of the three phases of the steering motor while the switching element is not positioned between the first and second current sensors and the remaining two phases of the three phases of the steering motor.

14. The steering assist device of claim 13, wherein the controller unit determines that the current sensor is in a normal state if an amount of difference between the sum and the preset normal total current value is less than or equal to a preset normal total current difference value.

15. The steering assist device of claim 13, wherein the controller unit determines that the current sensor is in an abnormal state if an amount of difference between the sum and the present normal total current value is more than a preset normal total current difference value.

16. The steering assist device of claim 13, wherein the preset normal total current value is 0.

17. The steering assist device of claim 13, wherein the three legs of the inverter comprise a first leg including a first high-side switching element and a first low-side switching element connected in series with each other, a second leg including a second high-side switching element and a second low-side switching element connected in series with each other and a third leg including a third high-side switching element and a third low-side switching element connected in series with each other; and
wherein the three power paths comprise the first power path, the second power path, and the third power path, with the first power path connecting a first point on the first leg, positioned between the first high-side switching element and the first low-side switching element, to a first phase of the three phases of the steering motor, the second power path connecting a second point on the second leg, positioned between the second high-side switching element and the second low-side switching element, to a second phase of the three phases of the steering motor, and a third power path connecting a third point on the third leg, positioned between the third high-side switching element and the third low-side switching element, to a third phase of the three phases of the steering motor, wherein the first high-side switching element, the second high-side switching element, and the third high-side switching element are connected with a positive terminal of a power source, and wherein the first low-side switching element, the second low-side switching element, and the third low-side switching element are connected with a negative terminal of the power source and a ground.

18. The steering assist device of claim 17, wherein the first current sensor is positioned on the first power path, the second current sensor is positioned on the second power path, and the third current sensor is positioned between the third low-side switching element and the ground.

19. The steering assist device of claim 17, wherein the first current sensor is positioned on the first power path, the second current sensor is positioned on the third power path, and the third current sensor is positioned between the second low-side switching element and the ground.

20. The steering assist device of claim 17, wherein the first current sensor is positioned on the second power path, the second current sensor is positioned on the third power path, and the third current sensor is positioned between the first low-side switching element and the ground.

* * * * *